United States Patent [19]
Nasu

[11] Patent Number: 5,017,016
[45] Date of Patent: May 21, 1991

[54] METHOD OF PROCESSING ASBESTOS CHIPS AND APPARATUS

[75] Inventor: Kazuhito Nasu, Urawa, Japan

[73] Assignee: Takehito Nasu, Japan

[21] Appl. No.: 267,936

[22] Filed: Nov. 7, 1988

[30] Foreign Application Priority Data

Jan. 28, 1988 [JP] Japan .................................. 63-15862

[51] Int. Cl.⁵ ............................................ B01F 13/06
[52] U.S. Cl. ..................................... 366/139; 366/136
[58] Field of Search ............... 366/139, 131, 136, 137, 366/138, 159, 179, 5, 3

[56] References Cited

U.S. PATENT DOCUMENTS 4,444,508 4/1984 Kreuer ................................. 366/139
4,854,715 8/1989 Eirich .................................. 366/139

Primary Examiner—Robert W. Jenkins
Attorney, Agent, or Firm—Woodling, Krost and Rust

[57] ABSTRACT

A method and apparatus for processing asbestos chips to render them into an environmentally safe state for storage. The chips are deaerated under negative pressure while being agitated and kneaded with cement into a muddy state. After they are solidified, the absence of air bubbles in the asbestos fibers prevents the eventual scattering of the fibers into the environment.

3 Claims, 5 Drawing Sheets

F I G .1
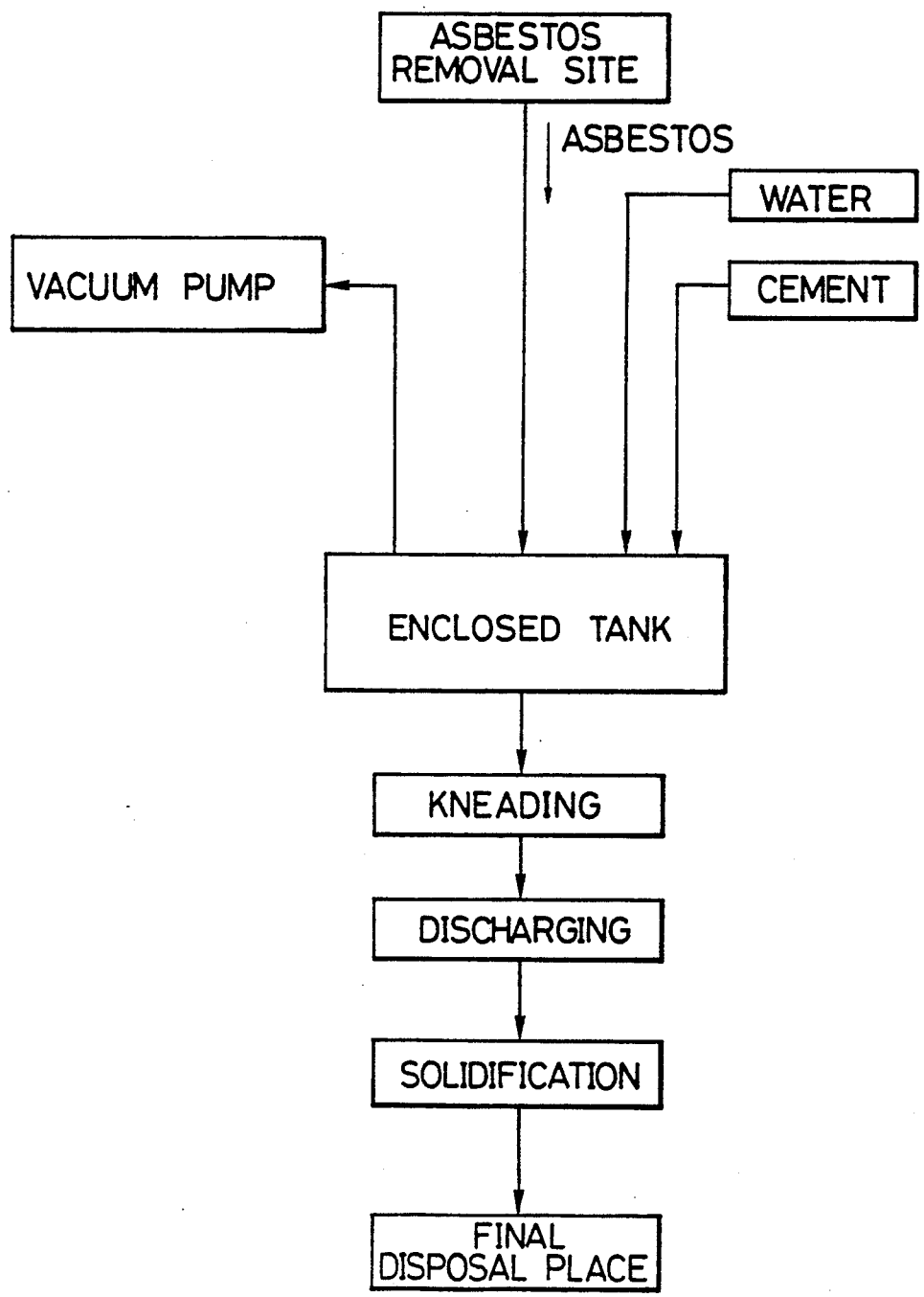

METHOD OF PROCESSING ASBESTOS CHIPS AND APPARATUS

The present invention relates to a method of processing asbestos chips and an apparatus therefor. In particular it relates to methods and apparatus for recovering crushed and detached asbestos chips without allowing said asbestos chips to float in the air, so that they may be converted into a solid state.

Background of the Invention and the Prior Art

Because asbestos contains cancer-causing substances, many attempts are being made to remove the asbestos which was widely used as a building material until recently. A problem is that asbestos removal work involves various hazards for health. To prevent floating asbestos dust from entering the human body, and to keep floating asbestos fiber from polluting the air and protect the living environment from deteriorating during asbestos removal work, attempts have been made to cover the work sites with vinyl sheets so as to prevent asbestos dust from scattering and to urge workers to wear a dust mask, and special working clothes, and dispose of these items of apparel contaminated with asbestos-contained dust after the completion of asbestos removal work in an effort to prevent the scattering of said asbestos dust. To safely dispose of the separated and detached asbestos chips removed it has been customary to recover asbestos chips into a vacuum car or a container vehicle on the work site and carry them to a solidification field, add cement and water to the asbestos chips to knead them and turn them into a muddy state, discharge the mixture into a processing vessel so as to solidify the muddy asbestos, and carry the solids to a special disposal place to discard them.

The prior art described above is capable of solidifying asbestos chips into lumps. However, asbestos fibers are straw-shaped, having hollow sections. As a result, the asbestos fibers are solidified with air confined in their hollow sections. Since the solidified asbestos chips are usually neglected at a disposal place, the air bubbles confined in the hollow sections gradually spread out with moisture over the surfaces of the asbestos blocks and start eroding the block surfaces so that the asbestos fibers are exposed to the block surfaces, producing a so-called "nappy state". Eventually, the asbestos fibers are scattered from the block surfaces, which results in air pollution. The attempts to solidify the asbestos chips into the concrete state, therefore, have not prevented their scattering or diffusion adequately.

SUMMARY OF THE INVENTION

In the present invention, the air bubbles confined in the hollow sections in the asbestos fibers are deaerated, then solidified so as to solve the aforesaid prior art problems. More particularly, the asbestos chips are agitated with water in the tank under negative pressure and further kneaded with cement to turn them into a muddy state.

The air and water confined in the hollow sections in the asbestos fibers being expelled as result of the agitation with water under negative pressure, the asbestos fibers are crushed and become almost flat.

Thereafter, the asbestos chips, crushed as mentioned above, are kneaded with cement under negative pressure to turn them into a muddy state, after which they are discharged from the tank and allowed to solidify. As a result, no "nappy" phenomenon of the asbestos fibers will be produced on the block surfaces, even if they are neglected when in the solidified state.

The apparatus according to the present invention comprises an asbestos chip suction and recovery pipe, a water supply pipe, a cement supply pipe, an open exhaust air pipe connected with a vacuum pump, a closable exhaust port, and a means for agitating and kneading the asbestos chips installed inside said enclosed tank.

Accordingly it is an object of the present invention to provide an improved process and apparatus for solidifying asbestos.

A further object of the invention is to provide a process and apparatus for converting asbestos waste into an environmentally safe form.

Yet another object of the invention is to provide a process and apparatus for removing the air from asbestos waste.

That these and other objects have been achieved will be seen from the specification and claims herein, taken together with the accompanying drawings in which:

FIG. 1 is a schematic flow chart which depicts an embodiment according to the present invention;

DETAILED DESCRIPTION OF A PREFERRED EMBODIMENT OF THE INVENTION

FIG. 1 shows a flow chart according to the present invention. The asbestos layers removed from the ceilings or walls of public facilities, or the asbestos plates which had been used as building materials, are crushed and detached with jet water on a work site and the thus removed asbestos materials are collected into an enclosed tank. Water is then supplied into the tank.

Alternatively, the enclosed tank is first fed with water through a water supply pipe and then the asbestos chips are sucked up and collected into the enclosed tank by way of an asbestos suction and collection pipe which is oriented at the water surface of the tank so that the chips may be immediately mixed with water inside the enclosed tank in an attempt to prevent the scattering of the asbestos chips within the enclosed tank.

Inside the enclosed tank, the asbestos chips mixed with water are kneaded with a means which will be described later. The tank is brought into a negative pressure by venting the air within the enclosed tank by way of an exhaust pipe connected to a vacuum pump and provided with an opening inside the enclosed tank. During these processes, not only the air bubbles remaining in the asbestos chips but also the air and water confined in the hollow sections of the asbestos fibers are expelled.

After the completion of the deaeration process, enough powdered cement is supplied into the enclosed tank to achieve a predetermined proportion of cement relative to the water. Then the valves of the water supply pipe and the cement supply pipe are closed. The exhaust operation of the exhaust pipe again brings the enclosed tank into a negative pressure state, after which the asbestos chips are then mixed with water and cement and kneaded in order to produce a muddy state.

Thereafter, the muddy asbestos chips are discharged into a particular disposal container, such as a vinyl bag, by closing the exhaust pipe and opening an exhaust port provided inside the enclosed tank.

After the whole quantity of the muddy asbestos chips is discharged from the enclosed tank, the discharge port is closed and the valve of the asbestos suction and collection pipe is opened once again, repeating the aforesaid process. In this manner the whole quantity of asbestos chips removed and detached on the site are turned into a muddy state, then discharged into a special disposal container.

The asbestos chips discharged into the container are solidified by the coagulation of cement in the same container, carried over to the final disposal place and discarded there.

Figure 2:
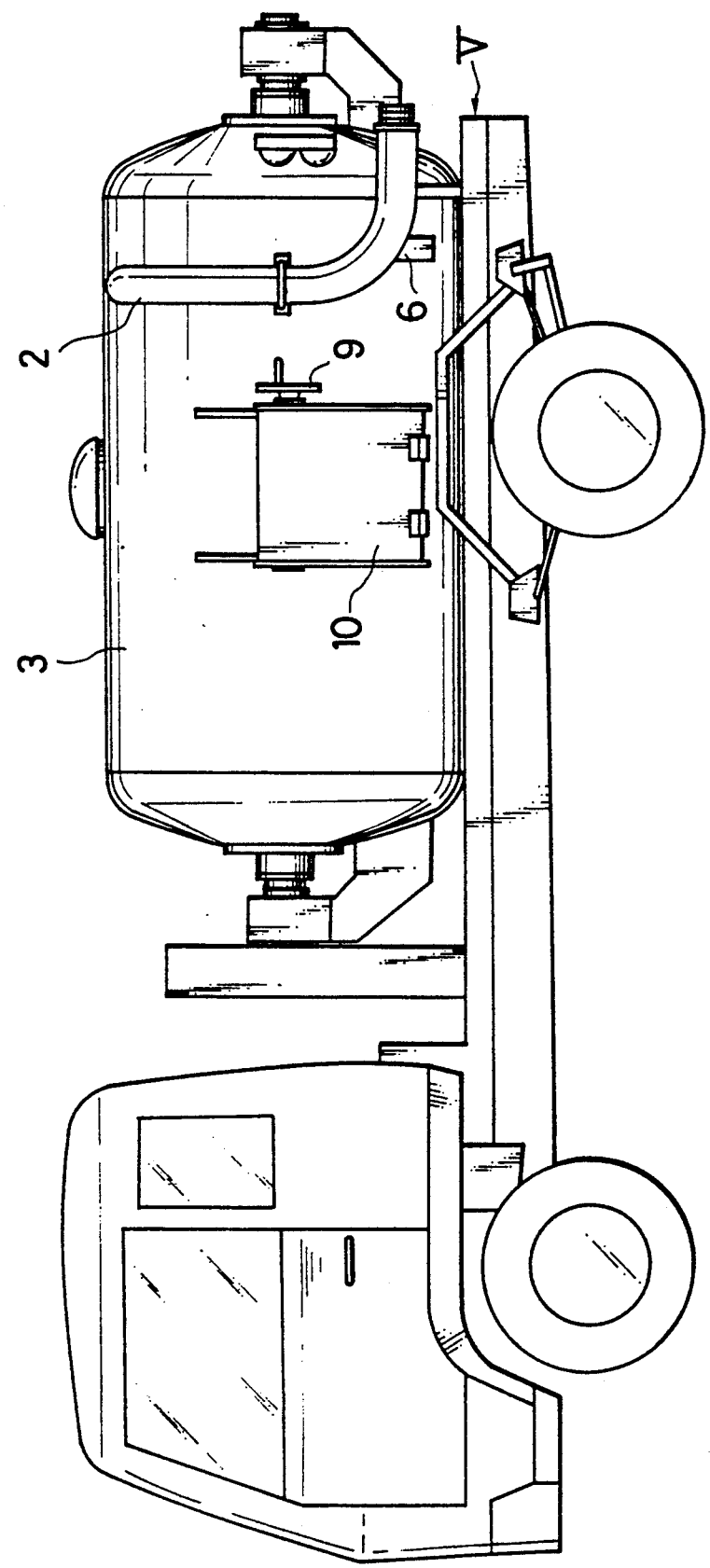
FIG. 2 is a side elevational view of a movable enclosed tank which embodies the asbestos chip recovery and processing method according to the present invention.
Figure 3:
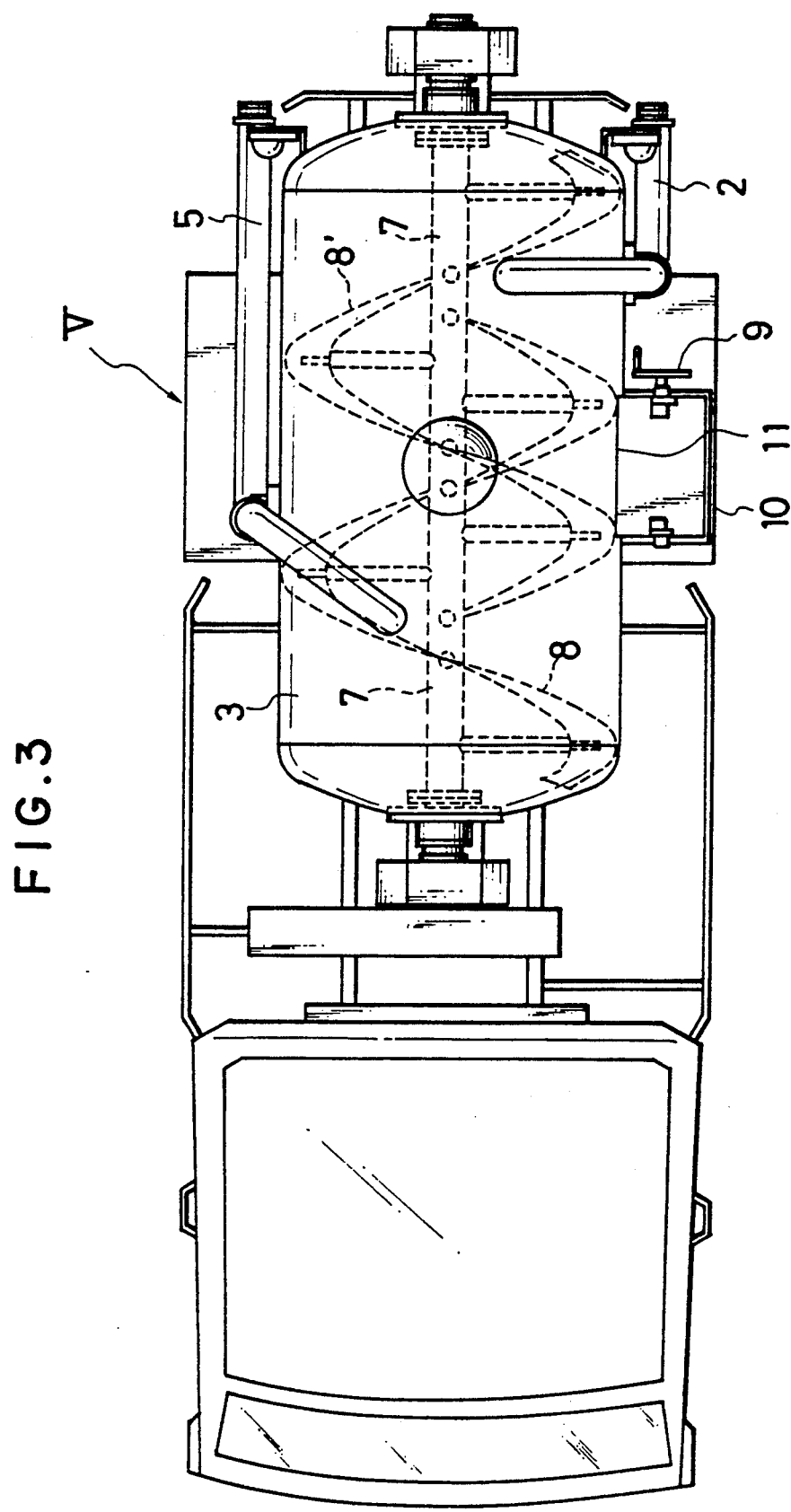
FIG. 3 is a plan view of the tank of FIG. 2 shown partly in phantom.

The enclosed tank may be of either of two types. One is a movable type which is installed to a vehicle as illustrated in FIG. 2 and FIG. 3. The other is a stationary type which is not illustrated herein. The both types do not differ markedly in the construction of enclosed tanks. Therefore, the movable tank is described with reference to FIG. 2 and FIG. 3.

The inside of the enclosed tank 3 installed to a movable vehicle V is provided with ribbon-screw shaped kneading blades 8,8' which are mounted on a kneading drive shaft 7 such that the blades 8,8' have a predetermined gap from the internal cylindrical wall of tank 3. The shaft 7 is horizontally installed to said enclosed tank 3 in its axial direction, its ends running through both end walls in a sealed manner and being rotatably received with bearings and supported on the body of the vehicle. The kneading blades 8,8', being symmetrically disposed but oppositely twisted to each other, enable the kneaded materials to be driven into the center of the enclosed tank when shaft 7 rotates in one direction, whereas the opposite rotation drives the material from the center to the ends.

The asbestos chip suction and collection pipe 2 is provided with an opening in the upper part inside the enclosed tank 3. As described above, the enclosed tank 3 is provided with said pipe 2 which is adapted to suck up and collect the asbestos chips with jet water and a cement supply pipe 6, seen in FIG. 2, branches therefrom so as to suck up cement by changing over a valve (not shown).

The exhaust pipe 5, which is connected to a vacuum pump, has an opening in the upper part inside the enclosed tank and produces negative pressure inside the enclosed tank 3.

A discharge port 11 is provided on the side in the center of the enclosed tank 3. Discharge port 11 is provided with a cover 10 which also serves as an exhaust chute. It opens and closes by the operation of a handle 9, discharging the kneaded muddy asbestos chips into a processing container adapted to solidify said chips.

In operation, the removed and detached asbestos chips are collected into the enclosed tank 3 when the enclosed tank 3 is brought into a negative pressure state by the exhaust operation of the exhaust pipe 5 which is connected to a vacuum pump. The valve of the cement supply pipe is closed at that time.

When a specified amount of asbestos chips are collected into the enclosed tank 3, a specified amount of water is supplied into tank 3 through a water supply pipe, which may be cement supply pipe 6. Rotary motion of the kneading blades 8,8' agitates the asbestos chips and water within the tank 3, which is maintained at negative pressure by the continuing exhaust operation.

The aforesaid agitation operation under negative pressure not only deaerates the air remaining among the collected asbestos chips positively but also removes substantially all the air bubbles confined in the hollow sections in the aforesaid asbestos fibers.

Then, the valve of the cement supply pipe 6 is opened so as to suck up a specified amount of cement powder into the enclosed tank 3 to be added to the fluid asbestos chips. The chips are then kneaded with the cement by the kneading blades 8,8' while the valve of cement supply pipe 6 is closed.

Since the exhaust operation inside the enclosed tank 3 is continued even during the kneading operation, the enclosed tank 3 is brought into the condition of negative pressure once again, thereby continuing the deaeration operation.

Having been deaerated and having the water removed from the hollow sections of their fibers, as described above, the asbestos chips, which are well kneaded with cement and turned into a muddy state, are discharged outside the enclosed tank 3 by closing the valve of the exhaust pipe 5 and opening the cover and exhaust chute 10. The muddy asbestos chips inside the enclosed tank 3 are driven into the center of the tank 3 by the reverse rotation of the kneading blades as described above and all the muddy asbestos chips are discharged from the discharge port 11 through the cover and exhaust chute 10.

The discharged muddy asbestos chips are then loaded into a processing container and solidified there by the coagulation of the cement.

After the full solidification, the air within the container (bag) is sucked out; and the container is fastened by a suitable band in a manner similar to the so-called "vacuum pack". The thus solidified asbestos chips are carried to a disposal site and buried.

In case dryness of the asbestos waste causes a problem, an appropriate amount of water may be injected into the enclosed tank 3 from a water supply vehicle which has been moved to the work site before the asbestos removing operation. Dried asbestos chips and cement are then forcibly sucked up and dropped vertically at the water surface within the enclosed tank 3 filled with water thus preventing the asbestos chips and cement from scattering.

The subsequent operations which include agitation and kneading are the same as described above. A second embodiment of the invention will be explained with reference to FIGS. 4 through 6.

Figure 4:
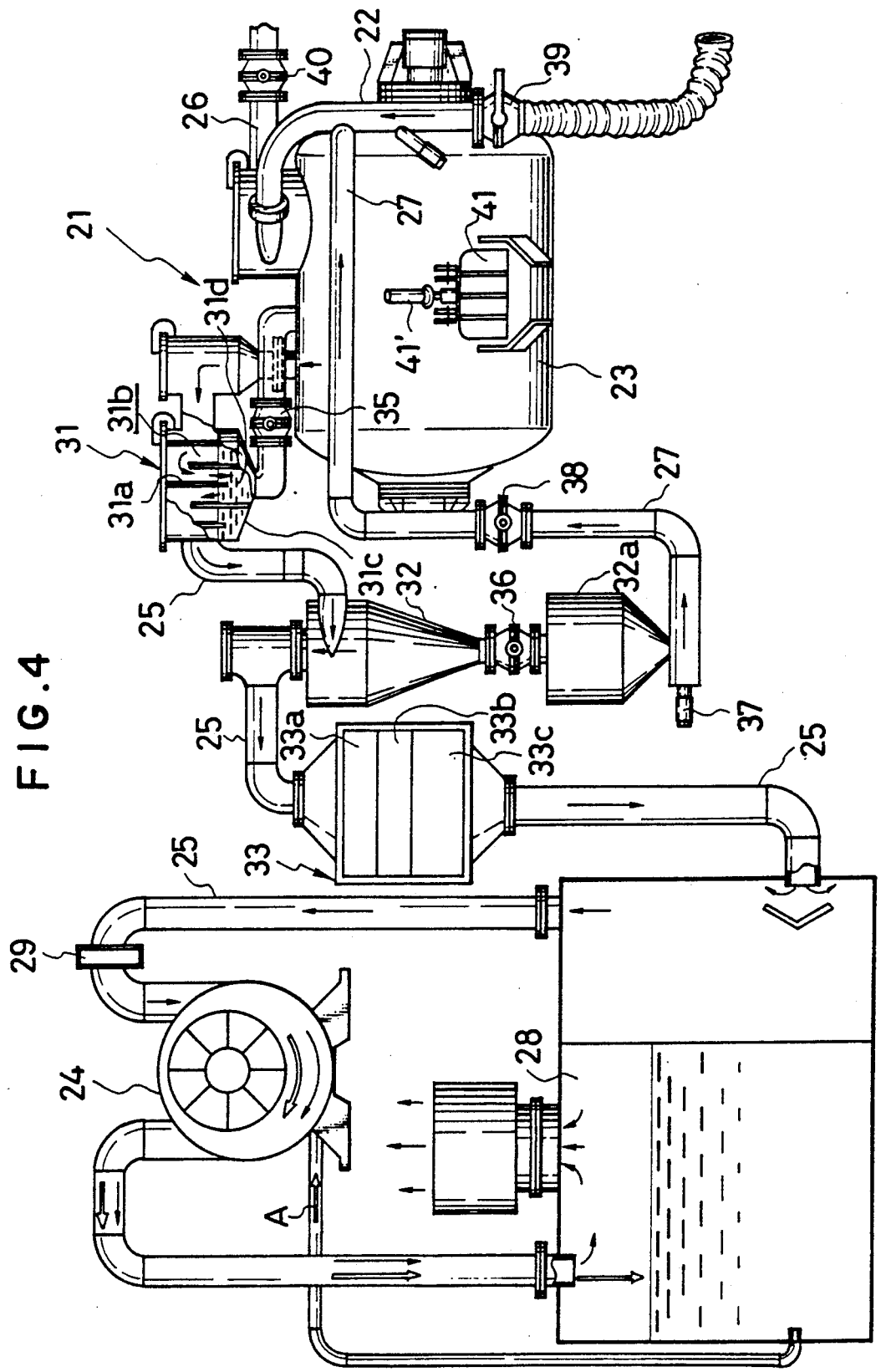
FIG. 4 is a side elevational view, partly schematic, of a second embodiment of the invention.

In FIG. 4 can be seen an asbestos processing apparatus 21, which comprises an enclosed tank 23 having an agitating/kneading means which is the same as the one described above, asbestos suction and collection pipe 22 connected to the tank 23 for collecting asbestos chips from the working site of detachment of asbestos, water (and cement) supply pipe 26, vacuum pump 24 for deaerating the tank 23, exhaust line 25 for connecting the tank 23 and the vacuum pump, dust collecting means 31, 32 and 33, re-collection line 27 for retrieving asbestos chips trapped by the dust collecting means and returning them to the tank 23, and a plurality of valves 35, 36, 37 and 38 provided in the re-collection line 27 and at other points as shown. Asbestos collection valve 39 and supply valve 40 are provided to the asbestos collection pipe 22 and water (cement) supply pipe 26, respectively. A discharge port 41 is provided to the tank 23.

The power source is preferably an engine of the vehicle, by which the vacuum pump and hydraulic pump are driven as to be mentioned later.

Vacuum pump 24 is utilized to deaerate the enclosed tank 23. The pump 24 is of the water-sealed rotary type, which discharges air from the exhaust line 25 and water from the circulation water tank 28 simultaneously to deaerate the tank 23. The water circulates as indicated by arrow A between the vacuum pump 24 and the water tank 28. A check valve 29 is provided at the immediate upstream of the pump 24 for preventing the air from flowing in the reverse direction.

The safety standard for asbestos processing is that up to two asbestos fibers are permissible per 1 cc. of air. To achieve said safety standard, three separate dust collecting means 31, 32 and 33 are provided. The first dust collecting means is a dust collecting apparatus 31 utilizing water, the second means is a cyclone type dust collecting apparatus 32, and the third one is a filter type dust collecting apparatus 33. In order to effect efficient dust collecting, means capable of trapping comparatively large particles is located at the upper stream and means capable of trapping comparatively small particles is located at the lower stream. Needless to say, relatively large asbestos chips may remain inside the enclosed tank 23; and those relatively small asbestos particles passing the tank 23 are collected by means of these dust collecting means and are prevented from being scattered into the atmosphere. Furthermore, those asbestos chips trapped by means of the first dust collecting means 31 and the cyclone type dust collecting means 32 are arranged to be returned to the enclosed tank 23. A plurality of valves are provided for the recollecting operation of the trapped asbestos chips to the tank 23 as to be mentioned later. The re-collection line 27 may alternatively be directly connected to the tank 23.

In the first dust collecting means 31, a zig-zag flow path 31b is formed by means of partition plates 31a. A mixture of air and asbestos chips is introduced into the water 31d contained in the bottom portion 31c and the asbestos chips are trapped in the water 31d by virtue of the difference in the specific gravity between the air and the asbestos chips as the air mixture turns its direction in the zig-zag flow path. Said water 31d is adapted to be discharged to the tank 23 by opening a first change-over valve 35.

The cyclone type dust collecting device 32 is of a type known to those skilled in the art; generally, it can trap dust whose size is in the order of 2 to 5 microns. At the lower stream of the cyclone 32, a collection tank 32a is provided with a second change-over valve 36 therebetween. The tank 32a in turn is connected to the re-collection line 27.

The re-collection line 27, which is connected to the asbestos chips collection pipe 22 at the lowermost position, has a suction valve 37 at the most upstream position and a third change-over valve 38 at the middle stream position, respectively. The collection tank 32a discharges into line 27 between the suction valve 37 and the third change-over valve 38.

Furthermore, at the lower stream position relative to the cyclone 33, a filter type dust collecting device 33 is provided, which comprises a first filter 33a, a second filter 33b and a third filter 33c. In this case as well, the filter means capable of catching smaller particles is located at the lower stream position. The third filter may catch dusts which are as small as about 0.3 microns.

In this embodiment, the processing comprises the steps of: sucking/collecting asbestos chips, water supplying, deaerating the tank, cement supplying, agitating/kneading, pressure raising, discharging, re-deaerating and re-collecting trapped asbestos chips.

For collecting asbestos chips in the first place, the vacuum pump 24 is operated with the valves 35 through 40 open; the separated and detached asbestos chips are sucked and collected into the enclosed tank 23 through the collection pipe 22.

A part of the collected asbestos chips flows into the exhaust line 25 from the tank 23; however, the dust collecting means 31, 32 and 33 catch these asbestos chips (dusts) and prevent the asbestos chips from escaping into the atmosphere.

Next, a specified amount of water is supplied to the tank 23 through the pipe 26.

With the suction valve 39 closed, the vacuum pump 24 is operated to deaerate the tank 23 while agitating water and asbestos chips therein as mentioned with reference to the first embodiment.

Thereafter, under negative pressure, a specified amount of cement powder is supplied to the tank 23 through the pipe 26.

Then, the mixture is agitated and kneaded by means of the agitating/kneading means (not shown) to turn the mixture to a muddy state.

After that, asbestos collection valve 39 is opened and with pump 24 off, the pressure in the tank 23 is permitted to rise to atmospheric pressure. The discharge port 41 is opened by means of a hydraulic cylinder 41' and the muddy state asbestos is discharged into a container, such as a vinyl bag.

After discharging all the muddy asbestos chips from the tank 23, the discharge port 41 and asbestos collection valve 39 are closed; and the vacuum pump 24 is operated to bring the inside of the tank 23 to negative pressure again. At this time, all valves are closed except for the second change-over valve 36.

In the next place, the asbestos chips trapped in the dust collecting means are re-collected. Firstly, the first change-over valve 35 is opened to discharge the water 31d in the dust collecting device 31 to the tank 23. Then, the first change-over valve 35 is closed. Next, the second change-over valve 36 is closed, the suction valve 37 and the third change-over valve 38 are opened to discharge the asbestos chips held in the re-collection tank 32a to the enclosed tank 23.

After completing the above-mentioned series of steps, water is again supplied to the first dust collecting device 31; and with the valves 35, 37 and 38 closed and the valves 36 and 39 opened, processing of the asbestos chips as mentioned above is repeated.

The muddy asbestos chips discharged into a container turn to a solid state, are transported to a final disposal site and are discarded there.

The re-collecting step may be conducted between the asbestos collecting step and the cement supplying step.

Figure 5:
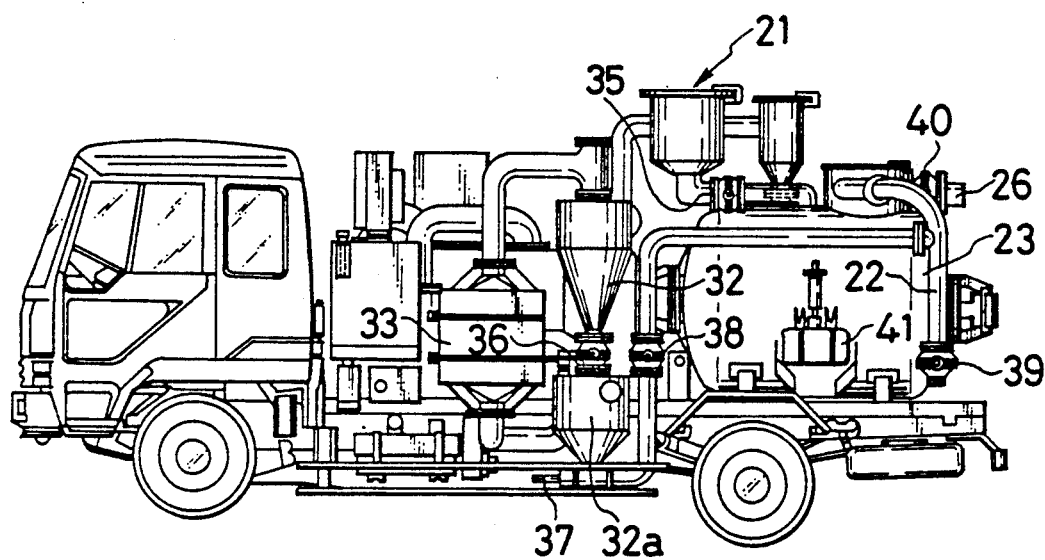
FIG. 5 is a side elevational view of a vehicle adapted to carry the embodiment of FIG. 4.
Figure 6:
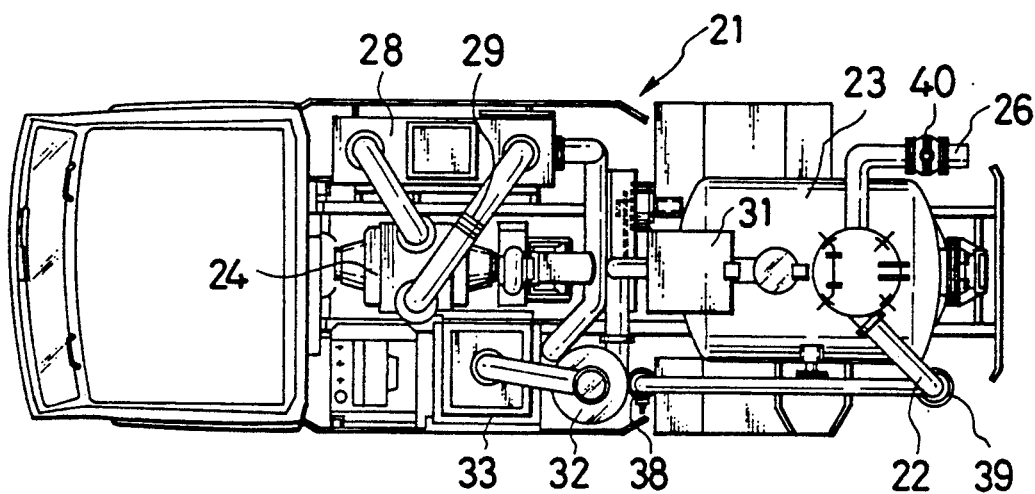
FIG. 6 is a plan view of the vehicle of FIG. 5.

FIGS. 5 and 6 show how the system of FIG. 4 may conveniently be arranged on a motor vehicle.

The method and apparatus described herein represent a great advantage over the prior art methods in which asbestos chips are kneaded with water and cement and solidified under atmospheric pressure.

In accordance with the present invention, even the air and moisture confined in the hollow sections of asbestos fibers can be removed sufficiently so that after the asbestos is solidified by the addition of water and cement, the solidified asbestos chip blocks contain no air bubbles or moisture. Therefore, even if the blocks are neglected after disposal, no nappy phenomenon of asbestos chips will appear on the block surfaces and any possible chance of scattering and diffusing the asbestos fibers will be eliminated.

Moreover, substantially all the asbestos chips may be collected and processed within the system as a result of the re-collecting operation utilizing dust collecting means, which has a remarkable advantage for the prevention of air pollution.

The invention has been described in detail with particular emphasis on the preferred embodiments thereof, but it should be understood that variations and modifications within the spirit and scope of the invention may occur to those skilled in the art to which the invention pertains.

What is claimed is:

1. An apparatus for processing asbestos chips comprising
   a tank for collecting asbestos chips; and means for agitating and kneading said asbestos chips inside said tank;
   said tank having an exhaust pipe connected to a vacuum pump, a water supply pipe, a cement supply pipe, and a discharge port, and
   dust collecting means between said tank and said vacuum pump.

2. An apparatus according to claim 1 and further comprising means for re-collecting asbestos chips flowing into said exhaust pipe and for returning said asbestos chips to said tank.

3. An apparatus for processing asbestos chips, water, and cement, said apparatus comprising
   an enclosed tank adapted to receive said asbestos chips, water, and cement,
   mixing means for agitating and kneading the contents of said enclosed tank,
   vacuum means to impose negative pressure upon said contents of said enclosed tank while said contents are being agitated and kneaded, discharge means for discharging said contents of said enclosed tank, and
   recollection means for recollecting and returning to said enclosed tank any of said asbestos chips, together with asbestos powder generated by said processing, entrained in said vacuum means.

* * * * *